(12) United States Patent
Marggraff et al.

(10) Patent No.: US 10,481,682 B2
(45) Date of Patent: Nov. 19, 2019

(54) SYSTEM AND METHOD FOR GENERATING VIRTUAL MARKS BASED ON GAZE TRACKING (71) Applicant: GOOGLE LLC, Mountain View, CA (US)

(72) Inventors: Lewis James Marggraff, Mountain View, CA (US); Nelson G. Publicover, Mountain View, CA (US); Spencer James Connaughton, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 15/473,104

(22) Filed: Mar. 29, 2017

(65) Prior Publication Data
US 2017/0285742 A1 Oct. 5, 2017

Related U.S. Application Data (60) Provisional application No. 62/314,872, filed on Mar. 29, 2016.

(51) Int. Cl.
G06F 3/01 (2006.01)
G06F 3/0354 (2013.01)
G06F 3/00 (2006.01)
G06F 17/24 (2006.01)

(52) U.S. Cl.
CPC .............. G06F 3/013 (2013.01); G06F 3/005 (2013.01); G06F 3/0354 (2013.01); G06F 17/242 (2013.01)

(58) Field of Classification Search
CPC ....................................................... G06F 3/013
See application file for complete search history.

(56) References Cited

U.S. PATENT DOCUMENTS 9,767,613 B1 * 9/2017 Bedikian ............... G06T 19/006
2008/0244468 A1 * 10/2008 Nishihara ............... G06F 3/017
715/863

(Continued)

OTHER PUBLICATIONS

Written Opinion of the International Preliminary Examining Authority dated Feb. 22, 2018 for PCT Application No. PCT/US2017/024741, 7 pages.

(Continued)

Primary Examiner — Hang Lin (57) ABSTRACT

An electronic system generates at a display virtual writing corresponding to tracked motion of the tip of a pointer with respect to a surface based on proximity of the tip of the pointer to the surface and the gaze of a user's eye. The electronic system determines the location and motion of the tip of the pointer with respect to the surface based on images captured by scene cameras, and determines the focus and gaze direction of the user's eye based on images captured by a user-facing camera. By generating virtual writing at the display corresponding to tracked motion of the tip of the pointer based on proximity of the tip of the pointer to the surface and based on the focus and gaze direction of the user's eye, the electronic system can enable virtual writing and associated collaboration services without the need for a specialized writing surface or pointer.

19 Claims, 4 Drawing Sheets (56) References Cited

U.S. PATENT DOCUMENTS

| | | | |
|---|---|---|---|
| 2012/0206333 A1* | 8/2012 | Kim | G06F 3/013 345/156 |
| 2013/0032127 A1 | 12/2013 | Bychkov et al. | |
| 2014/0062965 A1* | 3/2014 | Lee | G06F 3/0488 345/178 |
| 2014/0092014 A1* | 4/2014 | Srinivasan | G06F 3/013 345/158 |
| 2014/0184494 A1 | 7/2014 | Burachas | |
| 2014/0364212 A1* | 12/2014 | Osman | A63F 13/213 463/31 |
| 2015/0077357 A1* | 3/2015 | Han | G06F 3/013 345/173 |
| 2015/0341400 A1* | 11/2015 | Vong | H04L 65/403 715/753 |
| 2016/0132726 A1* | 5/2016 | Kempinski | G06K 9/00617 382/117 |

OTHER PUBLICATIONS

International Search Report and Written Opinion correlating to PCT/US2017/024841, dated Jun. 19, 2017, 12 pages.
International Preliminary Report on Patentability dated Jul. 6, 2018 for corresponding PCT Application No. PCT/US2017/024741, 19 pages.
Lorenceau, Jean, "Cursive Writing with Smooth Pursuit Eye Movements" Current Biology vol. 22; pp. 1506-1509, Aug. 21, 2012.

* cited by examiner

SYSTEM AND METHOD FOR GENERATING VIRTUAL MARKS BASED ON GAZE TRACKING

CROSS-REFERENCE TO RELATED APPLICATIONS

The present application is related to and claims priority to the following application, the entirety of which is incorporated by reference herein: U.S. Provisional Patent Application Ser. No. 62/314,872, entitled "Methods and Systems for Wearable Writing and Drawing."

BACKGROUND

Field of the Disclosure

The present disclosure relates generally to imagery capture and processing and more particularly to virtual writing and drawing using captured imagery.

Description of the Related Art

Electronic writing and drawing, and collaborating in such activities with others, have traditionally been performed using writing tools such as pens, pencils, and styluses on surfaces such as touch-sensitive (capacitive) screens. More recently, smart pens have been developed to recognize micro-structures in a writing surface to determine the location of the smart pen in relation to the writing surface. However, in both cases, a user must have access to a surface that is compatible with the writing tool or smart pen.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The following description is intended to convey a thorough understanding of the present disclosure by providing a number of specific embodiments and details involving virtual writing and drawing corresponding to tracked motion of the tip of a pointer with respect to a surface based on proximity of the tip of the pointer to the surface and the gaze of a user's eye. "Writing" refers to all modes of forming marks, including inscribing, painting, drawing, engraving, sketching, and outlining. Thus, in addition to forming letters, symbols and words, writing may refer to the process of drawing a picture, creating an outline, or forming computer code. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-6 illustrate various techniques for employing an electronic device to generate virtual writing at a display, the virtual writing corresponding to tracked motion of the tip of a pointer with respect to a surface based on proximity of the tip of the pointer to the surface and the gaze of a user's eye. For example, a scene camera of the electronic device tracks motion of the tip of a pointer with respect to a surface. A processor of the electronic device receives images from the scene camera and determines, based on the images, a position and motion of the tip of the pointer with respect to the surface. A user-facing detector (e.g., a camera) captures images of a user's eye, and provides the images of the user's eye to the processor, which determines a focal point and gaze direction of the user's eye based on the eye images. The processor generates a mark at a display, the mark corresponding to the tracked motion of the tip of the pointer with respect to the surface 1) based on the proximity of the tip of the pointer to the surface, as indicated by the images provided by the scene camera, and 2) based on the focus and gaze direction of the user's eye, as indicated by the captured images of the user's eye. By generating marks at the display corresponding to tracked motion of the tip of the pointer based on proximity of the tip of the pointer to the surface and based on the focus and gaze direction of the user's eye, the electronic device can enable virtual writing and associated collaboration services without the need for a specialized writing surface or pointer.

Figure 1:
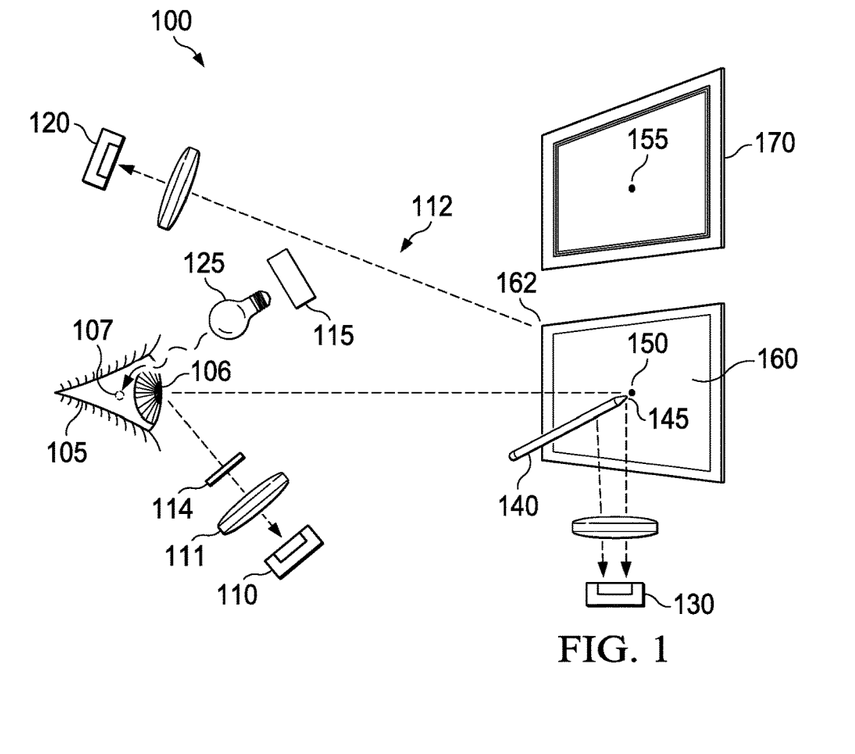
FIG. 1 is a diagram illustrating an electronic system configured to generate a mark corresponding to tracked motion of an end of a pointer relative to a writing surface based on the proximity of the end of the pointer to the writing surface and a gaze of a user's eye in accordance with at least one embodiment of the present disclosure.

FIG. 1 illustrates an electronic system 100 configured to generate a mark corresponding to tracked motion of an end of a pointer relative to a writing surface based on the proximity of the end of the pointer to the writing surface and a gaze of a user's eye in accordance with at least one embodiment of the present disclosure. A mark can be in the form of symbols, characters, cyphers, letters, words, icons, drawings, illustrations, cartoons, musical notes, schematics, flow charts, signs, organizational charts, and the like. The electronic system 100 can include a user-portable mobile device, such as a tablet computer, computing-enabled cellular phone (e.g., a "smartphone"), a head-mounted display (HMD), a notebook computer, a personal digital assistant (PDA), a gaming system remote, a television remote, and the like. In other embodiments, the electronic system 100 can include another type of mobile device, such as an automobile, robot, remote-controlled drone or other airborne device, and the like. For ease of illustration, the electronic system 100 is generally described herein in the example context of a mobile device, such as a tablet computer, HMD, or a smartphone; however, the electronic system 100 is not limited to these example implementations. In the depicted example, the system 100 includes a processing unit (not shown), at least one scene camera 120, 130, at least one user-facing camera or detector 110, a depth sensor 115, an illumination source 125, a surface 160, a pointer 140 having a tip 145, and a display 170.

The electronic system 100 includes a plurality of sensors to obtain information regarding a local environment 112 of the electronic system 100. The electronic system 100 obtains visual information (imagery) for the local environment 112 via scene cameras 120 and 130, and a depth sensor 115. In some embodiments, the scene cameras 120 and 130, and the depth sensor 115 are disposed at a forward-facing surface of a HMD or eyeglasses, and the user-facing camera or detector 110 is disposed at a user-facing surface of the HMD or eyeglasses. In one embodiment, the scene camera 120 is implemented as a wide-angle imaging sensor having a fish-eye lens or other wide-angle lens to provide a wider-angle view of the local environment 112 facing the surface 160. The scene camera 130 is implemented as a narrow-angle imaging sensor having a typical angle of view lens to provide a narrower angle view of the local environment 112 facing the surface 160. Accordingly, the scene camera 120 and the scene camera 130 are also referred to herein as the "wide-angle scene camera 120" and the "narrow-angle scene camera 130," respectively. As described in greater detail below, the wide-angle scene camera 120 and the narrow-angle scene camera 130 can be positioned and oriented on the forward-facing surface of the HMD or eyeglasses such that their fields of view overlap starting at a specified distance from the HMD or eyeglasses, thereby enabling depth sensing of objects in the local environment 112 that are positioned in the region of overlapping fields of view via image analysis. The user-facing camera 110 can be used to capture image data of at least one eye 105 of a user.

The depth sensor 115, in one embodiment, uses a modulated light projector to project modulated light patterns from the forward-facing surface of the HMD or eyeglasses into the local environment 112, and uses one or both of scene cameras 120 and 130 to capture reflections of the modulated light patterns as they reflect back from objects in the local environment 112. These modulated light patterns can be either spatially-modulated light patterns or temporally-modulated light patterns. The captured reflections of the modulated light patterns are referred to herein as "depth imagery." The depth sensor 115 then may calculate the depths of the objects, that is, the distances of the objects from the HMD or eyeglasses, based on the analysis of the depth imagery. The resulting depth data obtained from the depth sensor 115 may be used to calibrate or otherwise augment depth information obtained from image analysis (e.g., stereoscopic analysis) of the image data captured by the scene cameras 120 and 130. Alternatively, the depth data from the depth sensor 115 may be used in place of depth information obtained from image analysis. To illustrate, multiview analysis typically is more suited for bright lighting conditions and when the objects are relatively distant, whereas modulated light-based depth sensing is better suited for lower light conditions or when the observed objects are relatively close (e.g., within 4-5 meters). Thus, when the electronic system 100 senses that it is outdoors or otherwise in relatively good lighting conditions, the electronic system 100 may elect to use multiview-based reconstruction to determine object depths. Conversely, when the electronic system 100 senses that it is indoors or otherwise in relatively poor lighting conditions, the electronic system 100 may switch to using modulated light-based depth sensing via the depth sensor 115.

The user-facing camera or detector 110 is configured to detect a focus and gaze direction of a user's eye 105. In some embodiments, the user-facing camera or detector 110 may be a CMOS (complementary metal oxide) or CCD (charge-coupled device) detector. By tracking eye movements, the electronic system 100 can discern the user's intent. In at least one embodiment, the electronic system 100 tracks one or more of the following types of eye movements: 1) vestibulo-ocular, 2) vergence, 3) smooth pursuit, and 4) saccadic. The electronic device 100 can distinguish different types of movements based on parameters such as range of motion, velocity profile, whether both eyes perform conjugate (versus dissimilar direction) movements, and whether the head or visual field is also moving. Distinct neural circuitry is involved in each type of eye movement. Different eye movements involve different degrees of voluntary (i.e., conscious control) versus involuntary (i.e., reflex) neural pathways. During the process of discerning eye signals, it the voluntary movements of the eye can be analyzed by the electronic device 100 to identify the conscious intent of the user of the electronic system 100.

For example, smooth pursuit eye movements are slow, voluntary movements of the eye that keep the projection of a moving target object centered on the high-resolution, foveal region of the eye. Thus, overall velocities of smooth pursuit movements generally correspond to the velocities of the moving targets under observation. It is difficult for most individuals to execute smooth pursuit movements without actually viewing a moving target. In other words, unless substantial and specialized training by an observer has taken place, an attempt to initiate a smooth pursuit absent the ability to track a moving target simply results in an observer making one or more saccadic movements. In contrast, saccadic eye movements are rapid movements that abruptly change the fixation point of the eye. Saccades are "ballistic" in the sense that, once initiated, the direction and distance covered by the saccade are governed solely by the saccadic launch. In other words, no mid-course corrections are possible during a saccade, even if the position of a target changes during the time of saccadic initiation and/or its execution. A saccade is the fastest movement produced by the human body, reaching angular velocities up to 900°/second. A saccade is also "ballistic" in terms of its velocity profile. In response to an unanticipated stimulus, the initiation portion of a saccade takes about 200 milliseconds. Initiation leads to a phase of rapid acceleration where (similar to other ballistic velocity profiles) peak velocity is approximately proportional to the distance to be traveled. The movement phase of a saccade lasts from 20 to 200 milliseconds, depending on the total angular distance traveled. Normally, as long as the head remains motionless, saccades do not rotate the eye in a torsional axis (i.e., so-called Listing's Law). Saccades greater than approximately 20° are frequently accompanied by head movement although this varies widely from individual to individual.

There is a rapid deceleration phase as the direction of sight lands on the new target location. Following a very short delay, large saccades are frequently accompanied by at least one smaller corrective saccade to further approach a target location. Corrective saccades can occur even if the target has been made to disappear, further supporting the projected, ballistic nature of saccadic movements. However, corrective saccades are more frequent if the target remains visible. Thus, in at least one embodiment, the electronic device 100 can detect saccades to identify the likely intent of the user.

As another example, a "pursuit" is an additional mechanism to indicate that an activation or action is intended by a user. "Pursuits" are specifically designed around the ability of the human eye to follow an object using smooth pursuit. "Pursuits" can be used by the electronic system 100 in one of two functional modes: 1) if a 1-of-N selection is desired, then two or more graphical elements are projected radially outward at a constant velocity, moving away from the approximate central location of the original target location, or 2) if no selection is required (only activation) then the target pursuit interactable itself may move away from its original location. Following a pursuit object for a period of time and/or distance results in activation. A saccadic (or in rare cases, vestibulo-ocular or vergence) eye movement away from a smooth pursuit prior to a threshold time and/or distance being reached terminates the eye movement sequence without activation. All movements are carefully controlled (e.g., angular velocities are maintained well below 30°/second) so that they can be viewed via smooth pursuit, neurally regulated mechanisms.

Thus, the most common types of eye movements that can be performed directly or indirectly under voluntary control are: 1) saccades, 2) smooth pursuit, 3) vergence, and 4) vestibulo-ocular. Using eye position data determined from a series of eye images captured by the user-facing camera 110, algorithmic "filters" can be applied by the electronic device 100 to identify and distinguish, in real-time, the presence of saccadic or smooth pursuit eye movements. For example, in one embodiment the electronic device can employ a saccidic filter. The saccadic filter relies primarily on the fact that saccades are rapid. In fact, as mentioned previously, saccades are the most rapid movements in the human body with angular velocities up to 900° per second. The saccadic velocity profile is ballistic, where (up to displacements of about 60°) peak velocity is a linear function of distance traveled. For example, a 10° saccade has an angular velocity of roughly 300° per second whereas peak angular velocity for a 30° displacement is roughly 500° per second. An aspect of implementing eye signals based on saccades within the systems and methods herein is the ability to unambiguously couple or connect virtual or real objects located at two positions (i.e., the saccadic launch position and the saccadic landing position) anywhere within an observer's field-of-view without interference by objects along the visual pathway between the two positions. By performing a series of saccades, any number of objects or positions can be logically connected under voluntary user control to discern intent.

Saccadic movements are an order of magnitude faster than the fastest motions associated with smooth pursuit. This velocity difference is a key distinction within a smooth pursuit filter. The overall direction and speed of a smooth-pursuit eye movement must also match the velocity profile of the object that is under observation (unless the observer has received extensive training to avoid this). Thus, the electronic device 100 can distinguish smooth pursuit from saccades based on velocity, and from other eye movements (i.e., vergence and vestibulo-ocular movements) based on whether a match exists compared to the velocity profiles of displayed or real objects.

More specifically, when viewing slowly moving objects, a smooth pursuit can be recognized by close following of the object after a latency of approximately 100 msec. Smooth pursuit is generally recognized at angular velocities less that about 30° per second; although somewhat higher velocities may occur, particularly in the horizontal direction. At object movement velocities greater than those that can be followed by smooth pursuit, so-called "catch-up saccades" are used by humans to track objects in the environment. The electronic system 100 can distinguish a saccade-fixation sequence from smooth pursuit based on overall velocity as well as the start/stop velocity profile of saccadic sequences.

Another aspect of implementing a smooth pursuit filter within the systems and methods herein is the ability to unambiguously determine when a user is voluntarily following a specific object. By assigning meaning or purpose to different objects that can move about, the electronic system 100 can identify user intent by measuring which object (if any) is being followed. In at least one embodiment, the electronic system 100 selects 1-of-N states (or the absence of tracking any object) if there are N "trackable" objects moving about as indicated by the captured imagery.

To discern eye focus and gaze direction, the electronic system 100 may rely on any one of or a combination of pupil data, glint data or iris data. For example, a pupil may be visible and generating a stable edge, the correct number of well-spaced corneal glints may be produced by the system's illumination circuit, a limbus may be detected and its diameter within range of a population average, and/or an iris may be visible with enough information that its pose can be determined. The user-facing camera or detector 110 is configured to work in conjunction with one or more illumination sources 125. The illumination sources 125 may include one or more light emitting diodes (LEDs) to provide general illumination and/or illumination that produces reference "glints" 106 on the surface of the eye 105. The illumination source(s) 125 may utilize invisible (e.g., near infrared) light to avoid distracting the user and still be detectable by a CMOS or CCD detector. In some embodiments, the user-facing camera or detector 110 includes one or more lenses 111 and may include one or more optical filters 114 to block unwanted, stray or ambient light, e.g., coupled to the detector.

To facilitate virtual writing and drawing, the user-facing camera 110 acquires images of the eye 105, including structures of the eye, such as the pupil 106, iris, and glints (reflections of light off the cornea) 107. The electronic system 100 may use glints in conjunction with known locations of the illumination sources 125 the user-facing camera 110 to determine a relative gaze direction of the eye 105. By filtering for saccadic versus smooth pursuit eye movements, the electronic system 100 can determine whether the user's eye is focused on and/or following a tip 145 of the pointer 140.

The surface 160 may be a physical surface or a virtual surface. For those embodiments in which the surface 160 is a physical surface, the surface 160 may be paper, a tablet, tabletop, wall, floor, ceiling, window, board, display, or other surface. The surface 160 may be planar or curved, such as a curved wall of a theater or the outside of a round pole. The surface 160 may also include numerous non-planar surfaces, such as the side of a building. In those embodiments in which the surface 160 is a virtual surface, the virtual surface may be displayed within an HMD of the user and any local or remote observers viewing the act and/or results of writing and drawing. The location of the virtual surface may be relative to stationary objects (such as walls or furniture) within the local environment 112 of the user, or to moveable objects (such as a token than can be handed off to different writers or observers), or to a reference portion of the user (such as shoulders and/or chest area).

The pointer 140 may be a pen, pencil, stylus, chalk, laser pointer, stick, erasable marker, finger, fist, arm, and the like. The pointer 140 may deposit real ink (or other substance) or make real marks on the surface 160 at the time it is being used. During instances when real ink or other markings are not included, virtual marks may be superimposed at locations where real markings would be expected to appear within augmented reality or mixed reality displays worn by the user and/or one or more (remote or nearby) individuals observing the act of writing. In some embodiments, when writing on or near a surface 160 that also acts as a display 170, marks can be added to the display 170, providing feedback to the user as well as any observers.

In some embodiments, the pointer 140 may emit some form of electromagnetic radiation (e.g., infrared light) from one or more sources (located at the tip 145 or throughout the body of the pointer 140) that can be detected in scene camera images to aid in identifying pointer location. This radiation may be modulated (e.g., turned on and off) at a predetermined rate to further aid in identifying pointer 140 location and orientation. In some embodiments, the one or more emitters of electromagnetic radiation are pulsed on and off at a rate that ensures that images are acquired both with and without emitted radiation. By comparing (e.g., digitally subtracting) such images, the location of the radiation source (s) can be readily distinguished from other (stationary) components within acquired images.

In some embodiments, the scene cameras 120 and 130 may determine reference locations relative to the pointer 140 within the surface 160. Reference locations on the surface 160 may include the edges 161 and/or corners 162 of the surface 160, marks 150 on the surface 160, recognizable objects attached or affixed to the surface 160, visible or invisible light-emitting devices (e.g., light-emitting diodes) incorporated within or around the surface 160, and/or one or more displayed objects that may be used in situations where the surface 160 functions as a display.

The display 170 may be a screen, projector, or other display configured to indicate visible marks such as writing or drawing corresponding to the tracked motion of the tip 145 of the pointer 140 with respect to the surface 160 when the tip 145 of the pointer 140 is in contact with the surface 160. Causing marks to appear on the display 170 can be considered as writing with "virtual ink."

In some embodiments, the electronic system 100 can deposit "virtual ink" at the display 170 whenever the user's eye 105 views the pointer 140. When the electronic system 100 determines that the user's eye 105 has looked away from the pointer 140, the electronic system 100 stops the deposition of "virtual ink" at the display 170, even though the hand of the user and/or the pointer 140 may continue to move. The electronic system 100 can identify inadvertent writing based on the size of the area in the region of the tip 145 of the pointer 140 that causes the deposition of virtual ink, and/or the timing of eye movements within and around the region. For example, the electronic system 100 may filter quick glances in the region of a pointer tip to not deposit virtual ink.

In operation, scene cameras 120 and 130 capture images of the environment 112 of the user, including images of the pointer 140 and the surface 160. In those embodiments in which the surface 160 is a virtual surface, the scene cameras 120 and 130 capture images of the pointer 140 in relation to the virtual surface, whose coordinates are known to the electronic system 100. The processing unit (not shown) of the electronic system 100 uses the captured imagery from the scene cameras 120 and 130 and/or depth data from the depth sensor 115 to determine a distance from the tip 145 of the pointer 140 to the surface 160. The user-facing camera 110 captures images of at least one eye 105 of the user. The processing unit (not shown) of the electronic system 100 uses the captured imagery of the user's eye 105 to determine, based on pupil tracking, glints and/or iris tracking, and filtering for saccadic versus smooth pursuit eye movements, whether the user's eye is focused on the tip 145 of the pointer 140 and/or tracking the motion of the tip 145 of the pointer 140.

As the tip 145 of the pointer 140 contacts the surface 160 and makes a mark 150, the processing unit (not shown) records a virtual ink mark 155 at the display 170 corresponding to the mark 150 at the surface 160, based on a determination that the user's eye 105 is gazing at the tip 145 of the pointer 140 as the tip 145 makes the mark 150. The processing unit continues to deposit virtual ink at the display 170 corresponding to the tracked motion of the tip 145 of the pointer 140 based on the tip 145 of the pointer 140 continuing to contact the surface 160 and based on the tracked gaze of the user's eye 105. In some embodiments, the processing unit stops depositing virtual ink at the display 170 when the user's eye 105 stops gazing at the tip 145 of the pointer 140. In some embodiments, the processing unit continues depositing virtual ink at the display 170 when the gaze of the user's eye 105 leaves the tip 145 of the pointer 140 for less than a threshold amount of time.

In some embodiments, a second set of scene cameras (not shown) are configured to track motion of a second pointer (not shown) with respect to a second surface (not shown) and a second user-facing camera (not shown) is configured to track a gaze of at least one eye (not shown) of a second user. The same processing unit or a second processing unit (not shown) deposits virtual ink at the display 170 corresponding to tracked motion of the second pointer based on a determination that the second pointer is in contact with the second surface and based on the tracked gaze of the second user's eye. In this manner, the electronic system 100 deposits virtual ink on the display corresponding to marks made two or more users on the same or separate surfaces, allowing two or more users to collaborate in virtual writing or drawing.

Figure 2:
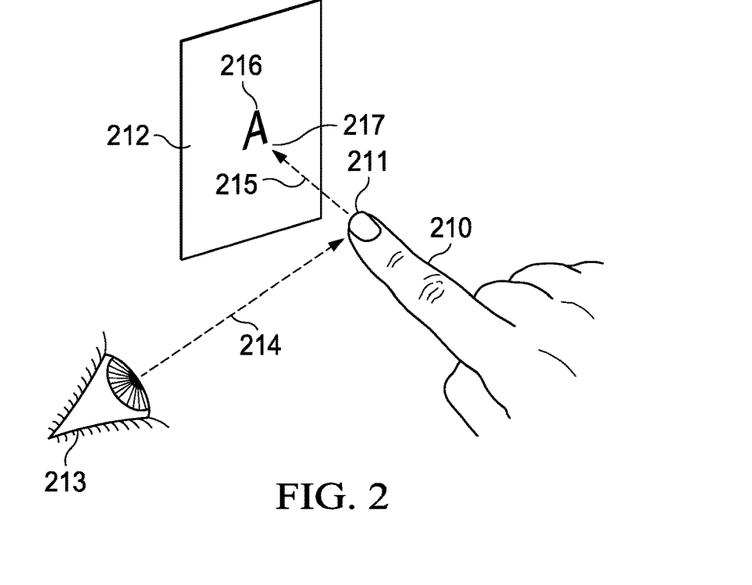
FIG. 2 is a diagram illustrating an embodiment of the electronic system of FIG. 1 in which the pointer is a finger and the mark is a letter in accordance with at least one embodiment of the present disclosure.

FIG. 2 is an illustration of an example operation of the electronic device 100. In this example, the pointer is a finger 210 and the surface 212 also serves as a display. When the processing unit (not shown) of the electronic device 100 determines based on images captured by the user-facing camera or detector (not shown) that at least one eye 213 of the user views the tip 211 of the finger 210, the processing unit (not shown) determines based on images captured by the scene camera(s) (not shown) a pointing direction 215 of the finger 210 based on the position of the tip 211 of the finger 210 relative to its body. If the direction 215 of the pointer 210 intersects with the surface 212, the processing unit deposits a mark or virtual ink at the surface 212 at the point of intersection 217. The deposition process continues as long as the processing unit determines based on images captured by the user-facing camera or detector (not shown at FIG. 2) that at least one eye 213 of the user continues to view the tip of the pointer 211 and based on images captured by the scene camera(s) that the pointing direction 215 intersects the writing surface 212. Writing stops whenever the processing unit determines that at least one eye 213 of the user has stopped following the tip 211 of the finger 210 or the finger 210 has stopped being directed at the surface 212. At the snapshot in time illustrated in FIG. 2, the user has completed the writing of the character "A" 216.

Figure 3:
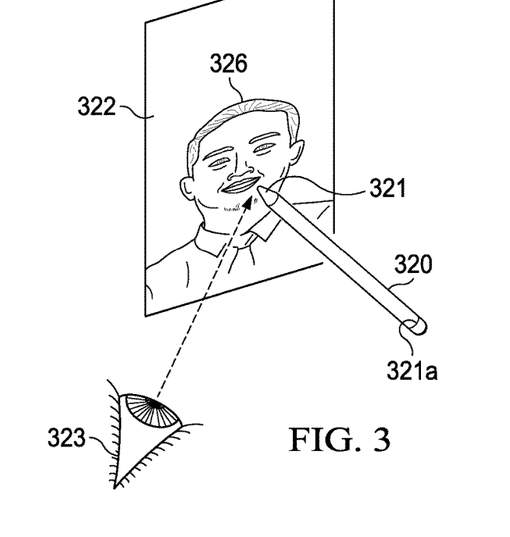
FIG. 3 is a diagram illustrating an embodiment of the electronic system of FIG. 1 in which the pointer is a pen and the mark is a drawing in accordance with at least one embodiment of the present disclosure.

FIG. 3 illustrates an example operation of the electronic system 100. In this example, the electronic system 100 employs a pencil or stylus 320 as a pointer wherein the pen or stylus 320 either presses against a writing surface 322, or is in close proximity with a surface 322. This close proximity between the tip of pointer 321 and the writing surface 322 reduces the need for the electronic system 100 to precisely determine a pointing direction of the pencil or stylus 320. Instead, the electronic system 100 considers the position of the tip of the pen or stylus 320 (possibly projected a short distance) as the writing position. In situations when the pen or stylus 320 is located some distance from the writing surface, one or more markings 321*a* (e.g., colored regions, illumination sources) can be placed on the body of the pen or stylus 320 to aid the electronic system 100 in determining the orientation of the pen or stylus 320.

When the electronic system 100 determines based on images captured by the user-facing camera or detector 110 that at least one eye 323 of the user is viewing the tip 321 of the pencil or stylus 320, the processing unit (not shown) deposits a mark or virtual ink near the tip 321. The processing unit continues depositing virtual ink as long as at least the electronic system 100 determines that at least one eye 323 of the user continues to view the tip of the pointer 321 and that the pointer remains in proximity to the writing surface 322. FIG. 3 illustrates the electronic system 100 drawing arbitrary shapes (e.g., a face 326) using virtual writing.

Figure 4:
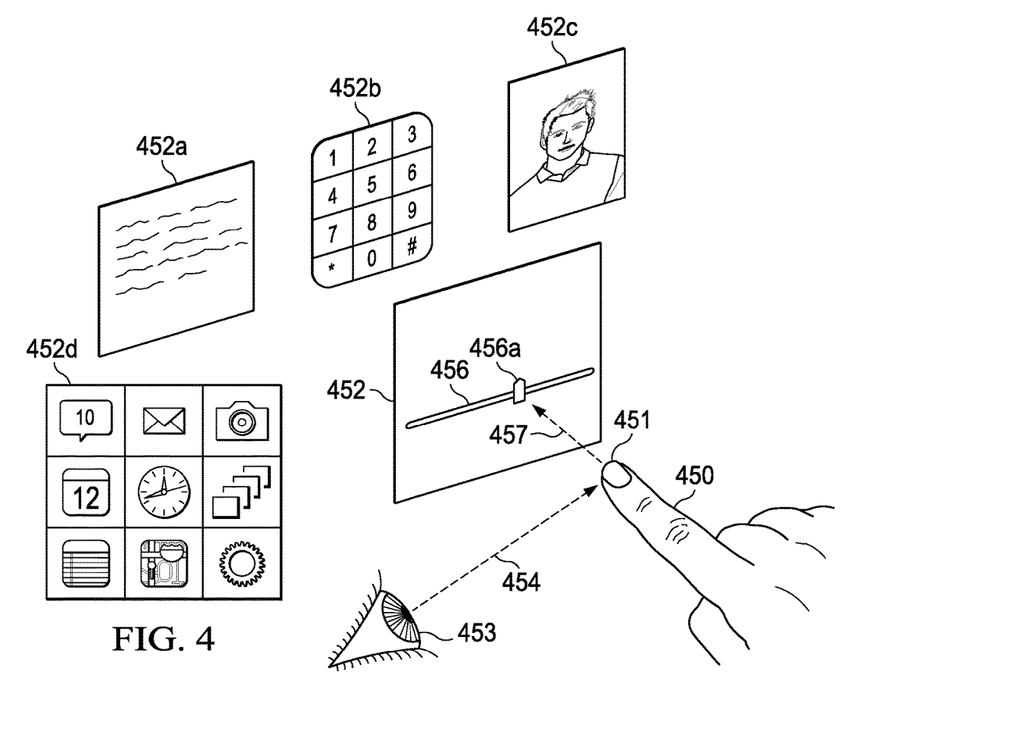
FIG. 4 is a diagram illustrating an embodiment of the electronic system of FIG. 1 in which the pointer is a finger that interacts with multiple surfaces in accordance with at least one embodiment of the present disclosure.

FIG. 4 illustrates an example of the electronic system 100 employing multiple writing surfaces 452, 452*a*, 452*b*, 452*c*, 452*d*. In the illustrated embodiment, the electronic system 100 employs a finger 450 as a pointer. When processing unit of the electronic system 100 detects that the gaze 454 of one or both eyes 453 of a user is directed at the tip 451 of the finger 450 based on images captured by the user-facing camera(s), the processing unit computes a pointing direction 457 of the finger 450. If the processing unit determines that the pointing direction 457 intersects the area of a primary writing surface 452, the processing unit establishes an active mode. In this example, the finger 450 controls a continuous or so-called "slider" 456 display wherein the pointing position and direction 457 determines the location of the active portion of the slider 456*a*. The electronic system 100, in turn, adjusts a continuously adjustable parameter such as the volume of an audio system, image brightness, line thickness, and the like, based on the active portion of the slider 456*a*.

In the example depicted in FIG. 4, in addition to the primary writing surface 452, the electronic system 100 includes writing surfaces 452*a*, 452*b*, 452*c*, 452*d*. The electronic system 100 detects a user's intent with respect to the writing surfaces by tracking the location and pointing direction of the finger 450 with respect to the writing surfaces or by detecting that the user is moving one or more surfaces about. The electronic system 100 may detect the user's intent through commands (e.g., move, copy, erase, exchange, deposit) based on eye-signal language or other forms of human-machine interface (HMI). In the examples shown in FIG. 4, three additional writing surfaces 452*a*, 452*b*, 452*c* appear above the primary writing surface 452 and one additional surface 452*d* is located to the right of the primary surface 452. As illustrated in FIG. 4, surfaces may differ in size and shape. In addition, the surfaces may be located at any distance from the user, in any orientation and/or in multiple planes. The surfaces may contain text 452*a*, numeric controls 452*b*, images 452*c*, or icons used to launch other applications or sources of information 452*d* including hyperlinks, URLs (universal record locators), and the like. The electronic system 100 may make any subset or all of the writing surfaces available to collaborators and co-authors located anywhere in the world.

Figure 5:
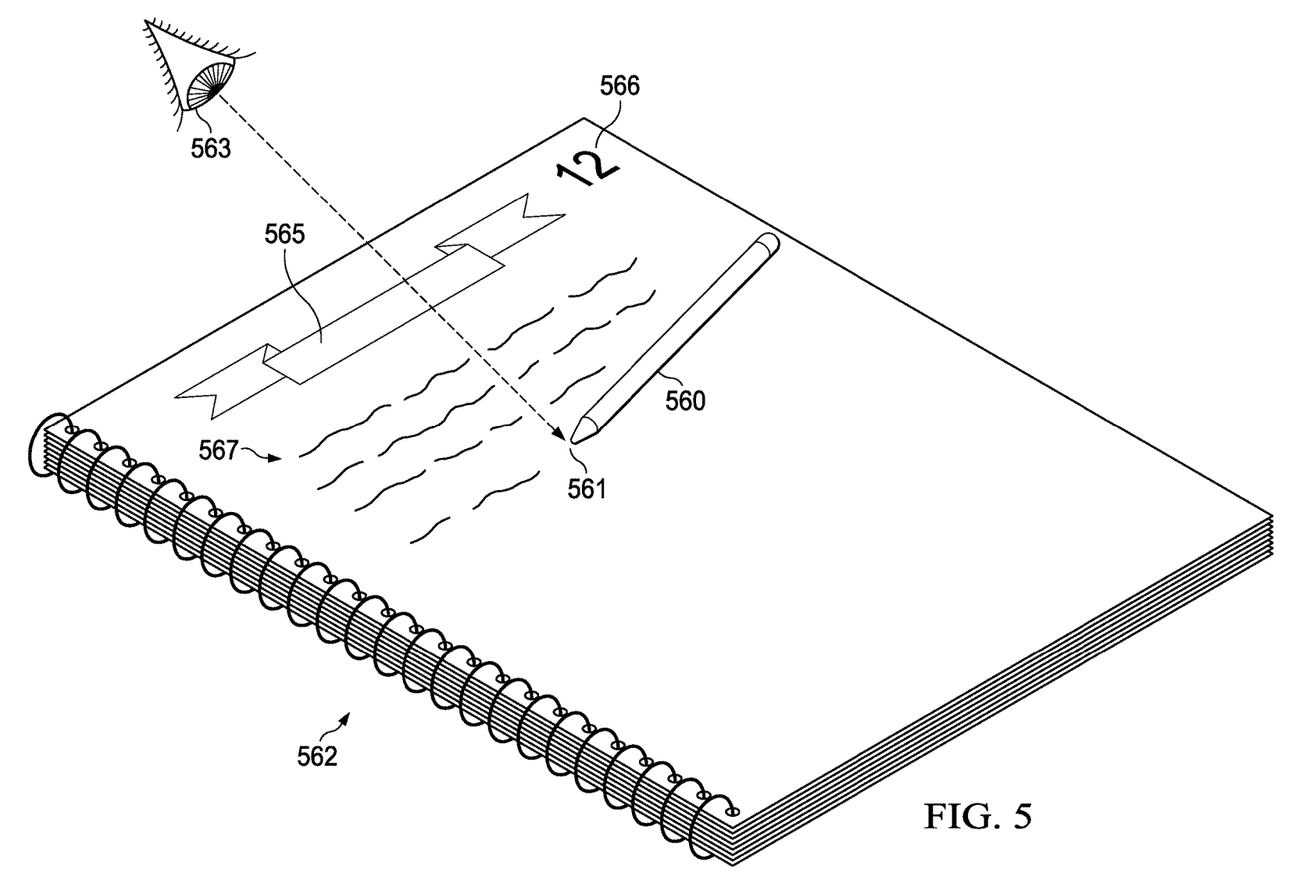
FIG. 5 is a diagram illustrating an embodiment of the electronic system of FIG. 1 in which the pointer is a pen and the surface is a notebook in accordance with at least one embodiment of the present disclosure.

FIG. 5 illustrates an example of the electronic system 100 employing a pen 560 to transcribe information into a notebook 562 while simultaneously recording the note-taking process using virtual ink. The electronic system 100 records notes when it determines that at least one eye 563 of the user is directed at the tip 561 of the pen 560 or other writing utensil based on images captured by the user-facing camera 110 and scene cameras 120 and 130. Notetaking may include character/object recognition and/or translation to transcribe recorded information into one or more machine-readable forms and/or other languages. The electronic system 100 may incorporate simultaneously recorded audio as well as other attributes of the writing session (e.g., identity of the writer, geolocation, date, time) in the data set that includes the virtual ink recording.

In the case of eye movement control of setup features or writing characteristics, the electronic system 100 detects voluntary eye movements that are intended to interact with a computing device as "eye signals." Eye signal controls are described in Systems and Methods for Biomechanically based Eye Signals for Interacting with Real and Virtual Objects, application Ser. No. 14/708,234, filed May 9, 2015, the entire disclosure of which is expressly incorporated by reference herein.

In some embodiments, the electronic system 100 uses "eye signals" to augment the writing process based on a pointer. The electronic system 100 retrieves components in response to detecting the eye-signal language and adds the components to the body of work, for example when the one or more users are employing one or more "virtual ink" displays. For example, the electronic system 100 can detect that a phrase, image, or sketch is being searched for, and can retrieve the phrase, image, or sketch in response to detecting a command in the eye-signal language, and may superimpose the phrase, image, or sketch on the composition being worked on. The electronic system's ability to retrieve and insert previously written or produced materials, greatly enhances the creative process.

In some embodiments, the electronic system 100 detects eye signals alone or in conjunction with other HMI devices to control the deleting or erasing of one or more sections of a creative piece. In some embodiments, the electronic system 100 is configured to allow a user to invoke an erase mode by selecting an erase pointer different from the pointer used for writing. In some embodiments, such as the electronic system depicted in FIG. 3, the pointer 320 includes one end 321 for writing and another end 321*a* for erasing, and the electronic system 100 detects which end the user selects based on which end of the pointer is closer to the surface 160 and the gaze direction of the user's eye. The electronic system 100 may delete or erase a section of a creative piece once a representation of the section is moved about on different writing surfaces and/or stored within a memory device located locally and/or remotely. In some embodiments, the electronic system 100 is configured to detect when a user has erased around a perimeter of a region of the surface 160, and to erase any marks within the perimeter in response to the perimeter having been erased or another signal received from the user.

In some embodiments, the electronic system 100 groups or clusters marks to further aid the creative process. The electronic system 100 may be group marks, for example, to form letters, words, phrases, sentences, paragraphs, or even larger clusters. The electronic system 100 may also group marks to form symbols, sketches, images, image components, groups of images, and the like. The electronic system 100 map Group marks automatically. For example, the electronic system 100 may automatically group marks to form letters, words and phrases. The electronic system 100 may also group marks based on commands by the user, for example, to associate a sentence or figure caption with a particular image. By grouping marks, the electronic system 100 can more efficiently manipulate marks such as by moving, copying, deleting, inserting, storing, and/or searching (i.e., involving fewer operations).

The electronic system's use of virtual ink for writing is particularly well-suited for collaborative creative efforts of multiple individual either in person and/or via remote teleconferencing/telepresence. In these exemplary applications, the electronic system 100 can assign full attributes to any level of detail (down to individual marks) of the creative result. For example, the electronic system 100 can assign the authorship of words, images, and other blocks of information to a particular co-author or sub-group of authors. The electronic system 100 can time stamp and geo-locate marks and/or mark groupings (e.g., words, images) for future reference. The electronic system 100 can similarly track the editing of existing documents and images using virtual ink to record "who did what, where and when." The electronic system 100 may incorporate such information as a part of a standardized data attribute and storage system wherein the contents may, for example, be legally binding. In some embodiments, the electronic system 100 may use the written or drawn signature of an individual to link the individual with the written contents.

Furthermore, the electronic system 100 can verify the true identity of the author of a signature or any other set of marks via biometric identification. Processes for identification of a device user are described in Systems and Methods for Discerning Eye Signals and Continuous Biometric Identification, application Ser. No. 14/708,241 filed May 9, 2015, the entire disclosure of which is expressly incorporated by reference herein. In this case, the electronic system 100 may recognize the process of signing and/or other movements as those of a headwear device wearer based on recognition of the hand and or pointer, its movements, and size (inversely proportional to distance from a scene camera); the identity of the device wearer may be confirmed based on biometric identification; and legally binding attributes may be assigned to written content.

In some embodiments, the electronic system 100 employs telepresence with the use of "virtual ink." Any or all participants can contribute to the writing process(es). Similarly, any or all participants can view results of the creative process. Processes for the communications involved in such exchanges are described in Systems and Methods for Using Eye Signals with Secure Mobile Communications, application Ser. No. 14/708,229 filed May 9, 2015, the entire disclosure of which is expressly incorporated by reference herein.

In some embodiments, the electronic system 100 can translate marks and/or groups of marks and/or transform the marks and/or groups of marks into alternate representations for an individual, group of individuals, all members of a collaborative group and/or archival repository. For example, the electronic system 100 may translate and display words and phrases that are written in one language in one or more alternative languages.

The electronic system 100 may convert speech to text (translated if necessary) and deposit the text onto a writing surface. Conversely, the electronic system 100 may convert (and translate if necessary) text that has been written or retrieved to speech. The electronic system 100 may scan and transform traditional writing (e.g., using a pen or pencil) into "virtual ink." The electronic system 100 may use such scanned or captured images as starting points or insertions into virtual writing sessions. The electronic system 100 can convert (automatically) roughly drawn symbols on, for example, a schematic diagram or organizational chart to formal symbols and representations at appropriate locations within a figure. The electronic system 100 can identify ragged lines, rectangles, circles, and other shapes and transform them into enhanced (e.g., smoothed, straightened, aligned) graphical representations of those shapes. The electronic system 100 can expand or reduce in size images that are displayed or drawn at one scale during certain times, for appropriate viewing by any or all participants when displayed, pointed to, or edited.

In some embodiments, the electronic system 100 can use other modalities to augment writings formed by "virtual ink." For example, the electronic system 100 can synchronize audio recorded from one or more (local or remote) locations with writing processes. Similarly, the electronic system 100 can simultaneously record images by one or more co-authors of the general environment or specific real-world objects (billboard, display, sporting event, etc.). The electronic system 100 can also synchronize and archive any other data stream that is available to wearable systems of co-authors (heart rate, acceleration, etc.) with virtual ink data sets.

When the electronic system 100 retrieves and re-plays virtual ink data sets, the electronic system 100 can optionally re-play simultaneously recorded data in a time-locked manner with the virtual ink composition. Simultaneously, the electronic system 100 can use recorded data sets in search algorithms to retrieve compositions. The electronic system 100 can perform searches based on what was written, what was said, a date and/or time stamp, and so on. Once retrieved, the electronic system 100 can pick up a virtual writing event to continue at any point including when and where participants concluded a previous session. The electronic system 100 can append any number of writing sessions in order to finalize one or more writing compositions.

In addition to using gaze direction as an indicator that purposeful writing movements are occurring, the electronic system 100 can also use gaze direction to isolate regions-of-interest within scene camera images that are used to record writing processes. For example, if the electronic system 100 does not detect a pointer (e.g., stylus, finger) in the region of a user's gaze, the electronic system 100 can determine that writing is not occurring and can devote computing resources to other tasks, or conserve power.

The electronic system 100 may include additional attributes and linkages in data sets based on information that has been either pre-printed or subsequently added to the notebook or other writing surface (map, sign, document, sheet of paper, book, electronic tablet, etc.). For example, one or more scene cameras (not shown in FIG. 5) may determine a title or banner 565 attributed to the book, chapter or page. Similarly, the one or more scene cameras may recognize a page number 566 that has been pre-printed or added to a particular page. The one or more scene cameras may also recognize existing text 567, figures, icons and the like. The electronic system 100 can use the existing text 567, figures, icons and the like to associate the information recorded during one writing session with one or more previous writing sessions. The electronic system 100 may archive all of these additional attributes and linkages and subsequently use them within search strategies to retrieve stored data sets.

In some embodiments, rather than viewing a "pointer," the user may instead view a location to direct where writing or other marking is displayed. In this case, the one or more cameras may continue tracking a pointer (even when the user is not looking directly at the pointer), or tracking a writing device in a number of alternative ways generally associated with so-called "digital pens." Such pens may use one or more on-board (i.e., within the pen) cameras to identify reference locations in the environment, accelerometers, embedded trackballs, magnetic coils (in conjunction with grid wires within a tablet), two or more microphones to detect broadcast acoustic reference signals and/or touch sensitive screens.

The writing region identified by the electronic system 100 using a user's eye gaze may be a projected display such as typically found in a conference room or classroom, one or more display monitors that may be viewed by any number of individuals including remotely, one or more augmented or virtual reality displays headsets viewable to the user and replicated to any number of other such headsets for viewing by others, signage, and similar display devices. Writing surfaces composed of multiple display devices do not necessarily need to be conjoined. For example, a user might view a region within any of a number of mobile tablet or laptop devices distributed about a conference room or classroom to add content to specific regions of a shared presentation.

The electronic system 100 takes direct advantage of the ability of the eyes to move rapidly to direct to a region where marks are to be written. As described previously, eye movements utilize the most rapidly moving muscles in the human body. Using rapid eye movements, the electronic system 100 can generally specify such writing/drawing regions more rapidly than when using pointing processes that utilize a computer mouse, trackball, finger pointing gesture, or similar devices. The electronic system 100 can switch from one region of one or more displays to another in order to add to a mosaic of information both rapidly and intuitively. By determining a region where writing or drawing is to take place subsequently based on such rapid eye signals, the electronic system 100 allows the more detailed spatial information required for the process of writing to be performed with a suitable writing device (utilizing high spatial resolution) without further relying on eye gaze (with its limited spatial resolution). Even though the user is not directly viewing the region of a manual writing, the visual feedback of seeing what is being written in the region being viewed by the user still allows a natural writing or drawing process to occur.

Figure 6:
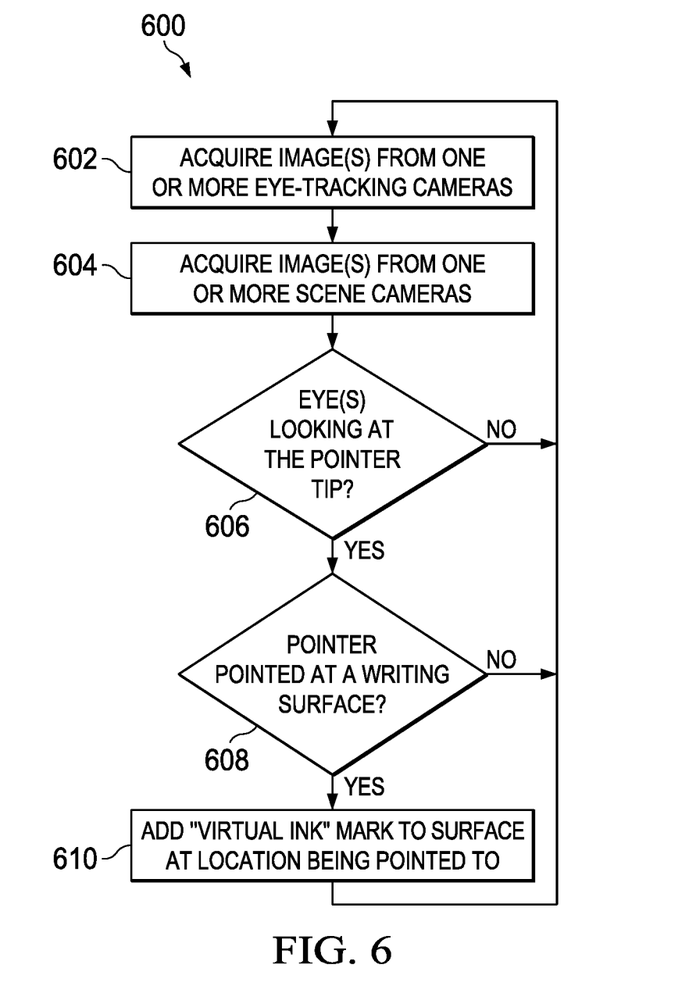
FIG. 6 is a flow diagram illustrating an operation of the electronic system of FIG. 1 to track motion of a pointer with respect to a surface and to record a mark on a display corresponding to the tracked motion of the pointer based on the proximity of a tip of the pointer to the surface and based on the tracked gaze of an eye of a user in accordance with at least one embodiment of the present disclosure.

FIG. 6 is a flow diagram illustrating a method 600 by which the electronic system 100 of FIG. 1 tracks motion of a pointer with respect to a surface and records a mark on a display corresponding to the tracked motion of the pointer based on the proximity of a tip of the pointer to the surface and based on the tracked gaze of an eye of a user in accordance with at least one embodiment of the present disclosure. The method initiates at block 602, where the electronic system 100 acquires images from one or more eye-tracking (user-facing) cameras 110. At block 604, the electronic system 100 acquires images from one or more scene cameras 120, 130. Based on these images, at block 606, the electronic system 100 determines if at least one eye of the user is viewing the tip 145 of the pointer 140. If not, no further action is taken and the method flow proceeds to block 602, at which the electronic system 100 acquires the next sets of images. If at block 606, the electronic system 100 determines that at least one eye of the user is viewing the tip 145 of the pointer 140, then the method flow continues to block 608, at which the electronic system 100 determines whether the pointer 140 is pointed at a writing surface 160. If not, no further action is taken and the method flow proceeds to block 602, at which the electronic system 100 acquires the next sets of images. If, at block 608, the electronic system 100 determines that the pointer 140 is pointed at the writing surface 160, then the method flow proceeds to block 610, at which the electronic system 100 deposits virtual ink to generate a mark at a location on a display 170 corresponding to the location of the pointer 140 with respect to the writing surface 160. In those embodiments in which the surface 160 also serves as a display, the electronic system 100 deposits virtual in at the location on the surface 160 at which the pointer 140 is pointed. In some embodiments, the electronic system 100 determines whether the newly added mark completes a character, symbol, or recognizable object on the writing surface. If so, then the electronic system 100 may act in a manner related to the newly formed character, symbol, or object. This may include performing an action or redrawing the character, symbol, or object.

In additional embodiments, characteristics of the writing may be controlled by the writer. These characteristics can include the color and brightness of virtual ink(s), the transparency of virtual ink display, the thickness of lines, calligraphy features of a writing "nib," whether character- and/or object-recognition is performed on written/drawn objects, and so on. These characteristics may be setup prior to and/or during the writing process. Individual setup characteristics (e.g., color) can be assigned to individual writers. This feature may aid in demonstrating "who wrote what" where multiple writers are contributing. One or more setup features may also be applied globally to all writers. Setup may involve traditional HMI techniques such as the use of a keyboard or touchscreen. In some embodiments, characteristics may be controlled by voice command or using eye movements.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   tracking, by a processing unit, motion of a first pointer in relation to a first virtual writing surface based on images captured by a first scene camera;
   tracking, by the processing unit, a gaze of first user's eye based on images captured by a first user-facing camera by filtering for saccadic eye movements versus smooth pursuit eye movements in relation to the motion of the first pointer; and
   recording, by the processing unit, at a display, a first mark of the first pointer on the first virtual writing surface based on:
      the filtering for the smooth pursuit eye movements;
      a direction of the first pointer intersecting with the first virtual writing surface;
      the tracked motion of the first pointer in relation to the first virtual writing surface; and
      the tracked gaze of the first user's eye, wherein recording the first mark continues recording the first mark on the first virtual writing surface when the tracked gaze of the first user's eye leaves the first pointer for less than a threshold amount of time.

2. The method of claim 1, wherein recording the mark is based on the gaze of the first user's eye focusing on an end of the first pointer.

3. The method of claim 1, wherein recording the mark comprises depositing virtual ink on the first virtual writing surface.

4. The method of claim 1, wherein the first pointer comprises a virtual object.

5. The method of claim 1, further comprising:
   tracking, by the processing unit, motion of a second pointer in relation to a second virtual writing surface based on images captured by a second scene camera;
   tracking, by the processing unit, a gaze of second user's eye based on images captured by a second user-facing camera; and
   recording, by the processing unit, at the display, a mark of the second pointer on the second virtual writing surface based on the tracked motion of the second pointer in relation to the second virtual writing surface and based on the tracked gaze of the second user's eye.

6. The method of claim 1, further comprising:
   prior to recording the first mark of the first pointer by the processing unit at the display, updating the tracked motion of the first pointer with depth information of the first pointer with depth data from a depth sensor.

7. The method of claim 1, further comprising:
   emitting electromagnetic radiation at a predetermined rate by the first pointer, wherein tracking the motion of the first pointer includes detecting the emitted electromagnetic radiation.

8. The method of claim 1, wherein tracking the motion of the first pointer includes determining an orientation of the first pointer based on a marking on the first pointer.

9. A method, comprising:
   tracking, by a processing unit, a gaze of a user's eye based on images captured by a first user-facing detector;
   tracking motion of an end of a first writing tool by the processing unit based on images captured by a first scene camera and filtered for saccadic eye movements versus smooth pursuit eye movements of the user's eye in relation to the motion of the first writing tool; and
   generating, by the processing unit, a mark at a display corresponding to the tracked motion of an end of the first writing tool with respect to a first virtual surface, wherein:
      generating the mark is based on a proximity of the end of the first writing tool to the first virtual surface, the filtered smooth pursuit eye movements, and the tracked gaze of a first user's eye;
      generating the mark includes depositing virtual ink at the display corresponding to the motion of the end of the first writing tool in response to identifying that a direction of the first writing tool intersects with the first virtual surface; and
      recording the first mark continues recording the first mark on the first virtual writing surface when the gaze of the first user's eye leaves the first pointer for less than a threshold amount of time.

10. The method of claim 9, wherein generating the mark is further in response to identifying that the gaze of the first user's eye is focused on the end of the first writing tool.

11. The method of claim 9, further comprising discontinuing generating the mark in response to identifying that the direction of the first writing tool does not intersect with the first virtual surface and resuming generating the mark in response to identifying that the direction of the first writing tool has re-intersected with the surface.

12. The method of claim 9, further comprising:
tracking, with the scene camera, motion of an erase pointer with respect to the first virtual surface; and
erasing at least a portion of the mark corresponding to the tracked motion of the erase pointer in response to identifying that eraser intersects with the first virtual surface and that the gaze of the first user's eye is focused on the eraser.

13. The method of claim 12, wherein the erase pointer comprises a virtual eraser.

14. The method of claim 9, further comprising:
tracking, by the processing unit, motion of an end of a second writing tool with respect to a second virtual surface based on images captured by a second scene camera;
tracking, by the processing unit, a gaze of a second user's eye based on images captured by a second user-facing detector; and
generating, at the processing unit, a mark corresponding to the motion of the end of the second writing tool based on a direction of the end of the second writing tool intersecting with the second virtual surface and based on the gaze of the second user's eye.

15. An electronic device, comprising:
a first scene camera configured to track motion of an end of a first pointer with respect to a first virtual surface;
a first user-facing camera configured to track a gaze of a first user's eye; and
a processor configured to:
filter the gaze of the first user's eye for saccadic eye movements versus smooth pursuit eye movements in relation to the motion of the first pointer;
identify that a direction of the first pointer intersects with the first virtual surface;
generate at a display a mark corresponding to the tracked motion of the end of the first pointer with respect to the first virtual surface based on a proximity of the end of the first pointer to the first virtual surface and the gaze of the first user's eye filtered for saccadic eye movements versus smooth pursuit eye movements in relation to the motion of the first pointer; and
generate the mark by depositing virtual ink at the display corresponding to the motion of the end of the first pointer in response to identifying that the direction of the first pointer intersects with the first virtual surface and based on the filtered smooth pursuit eye movements; wherein generating the mark continues on the first virtual writing surface when the gaze of the first user's eye leaves the first pointer for less than a threshold amount of time.

16. The electronic device of claim 15, wherein the processor is configured to generate the mark in response to identifying that the gaze of the first user's eye is focused on the end of the first pointer.

17. The electronic device of claim 15, wherein the processor is further configured to discontinue generating the mark in response to identifying that the direction of the first pointer does not intersect with the first virtual surface and to resume generating the mark in response to identifying that the direction of the first pointer has re-intersected with the first virtual surface.

18. The electronic device of claim 15, wherein the first scene camera is further configured to track motion of an erase pointer with respect to the first virtual surface and the processor is further configured to erase at least a portion of the mark corresponding to the tracked motion of the erase pointer in response to identifying that erase pointer is in contact with the first virtual surface and that the gaze of the first user's eye is focused on the erase pointer.

19. The electronic device of claim 15, further comprising:
a second scene camera configured to track motion of an end of a second pointer with respect to a second virtual surface; and
a second user-facing camera configured to track a gaze of a second user's eye, wherein the processor is further configured to generate at the display a mark corresponding to the tracked motion of the end of the second pointer with respect to the second virtual surface based on a proximity of the end of the second pointer to the second virtual surface and the gaze of the second user's eye.

* * * * *